(12) United States Patent
Michelini

(10) Patent No.: US 7,155,901 B2
(45) Date of Patent: Jan. 2, 2007

(54) CATALYST TEMPERATURE CONTROL ON AN ELECTRICALLY THROTTLED ENGINE

(75) Inventor: John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 10/413,874

(22) Filed: Apr. 15, 2003

(65) Prior Publication Data

US 2004/0206068 A1    Oct. 21, 2004

(51) Int. Cl.
F01N 3/00    (2006.01)

(52) U.S. Cl. .................. 60/298; 60/274; 60/285; 123/90.15

(58) Field of Classification Search ............ 60/274, 60/276, 284, 285, 298; 123/90.15, 90.19
See application file for complete search history.

(56) References Cited

U.S. PATENT DOCUMENTS

| | | | |
|---|---|---|---|
| 4,960,083 A | | 10/1990 | Seki et al. |
| 5,293,741 A | * | 3/1994 | Kashiyama et al. ......... 60/284 |
| 5,414,994 A | * | 5/1995 | Cullen et al. ............... 60/274 |
| 5,483,941 A | * | 1/1996 | Cullen et al. .............. 123/481 |
| 5,575,266 A | * | 11/1996 | Iida ........................ 123/680 |
| 6,155,217 A | * | 12/2000 | Shiraishi et al. ......... 123/90.15 |
| 6,161,377 A | * | 12/2000 | Boegner et al. ............. 60/274 |
| 6,360,531 B1 | | 3/2002 | Wiemero et al. |
| 6,394,051 B1 | | 5/2002 | Filipe et al. |
| 6,408,806 B1 | | 6/2002 | Sugiyama et al. |
| 6,510,685 B1 | * | 1/2003 | Bolz et al. ................. 60/285 |
| 6,526,745 B1 | * | 3/2003 | Ogiso ....................... 60/285 |

FOREIGN PATENT DOCUMENTS

JP            60090949 A    *    5/1985

OTHER PUBLICATIONS

SAE 922172, Steady-State Wide-Range Air-Fuel Ratio Control; Danny Milot, San Francisco, CA, Oct. 19-22, 1992.

* cited by examiner

*Primary Examiner*—Tu M. Nguyen
(74) *Attorney, Agent, or Firm*—Donald J. Lewis; Allan J. Lippa

(57) ABSTRACT

A method to regulate catalyst temperature by adjusting engine air and fuel amounts. The method provides catalyst temperature regulation while reducing fuel consumption.

11 Claims, 6 Drawing Sheets

CATALYST TEMPERATURE CONTROL ON AN ELECTRICALLY THROTTLED ENGINE

FIELD OF INVENTION

The present invention relates to a method for controlling an internal combustion engine and more particularly to a method for controlling catalyst temperature with an electrically throttled internal combustion engine.

BACKGROUND OF THE INVENTION

Certain driving conditions can produce elevated engine speed and load conditions that may increase engine exhaust feed-gas temperature. If sufficient temperatures reach emission-reducing catalysts for prolonged periods of time, reduction in long-term catalyst efficiency may result. Elevated catalyst temperatures can produce wash coat sintering and substrate deterioration, reducing wash coat surface area and catalyst efficiency. Catalyst temperature is commonly controlled using fuel enrichment because fuel enrichment reduces feed gas temperature without affecting catalyst long-term efficiency.

One method to control catalyst temperature by adjusting fuel is described in U.S. Pat. No. 4,960,083. This method provides generating a changeover-instructing signal for changing valve timing to the low speed valve timing in both the lower and higher engine speed regions, when an abnormality is detected and enriching the air-fuel ratio of an air-fuel mixture to be supplied to the engine. The enriching of the air-fuel ratio is carried out by multiplying a basic fuel injection period by a correction coefficient.

The inventor herein has recognized several disadvantages of this approach. Namely, the approach changes fuel delivery and valve timing without regard to engine torque. When fuel is enriched and valve timing changed, engine torque can change. Enrichment from stoichiometry increases engine torque until the Lean Best Torque (LBT) limit is reached; from that point, additional fuel no longer increases torque. Advancing or retarding valve timing may also increase or decrease torque depending on present valve timing. Since engine torque is not considered by the before-mentioned approach, the approach may introduce drivability concerns resulting from any torque variation.

Furthermore, the inventor has recognized that the approach increases engine fuel consumption while the catalyst temperature is being controlled by air-fuel enrichment. While controlling catalyst temperature is important to protect a catalyst from deterioration, fuel consumption affects emissions and operating costs.

SUMMARY OF THE INVENTION

One embodiment of the present invention includes a method to regulate catalyst temperature and engine torque. The method comprises: selecting a target catalyst temperature; comparing said target catalyst temperature to catalyst temperature; adjusting engine air amount based on said comparison temperature; and adjusting injected fuel amount based on said engine air amount. The method can be used to reduce the above-mentioned limitations of the prior art approaches.

By selecting a target catalyst temperature and adjusting engine air and fuel amounts, the inventor herein can regulate catalyst temperature while maintaining engine torque and reducing fuel consumption. In other words, since engines can produce additional torque when operated rich of stoichiometry, engine air can be reduced while maintaining engine torque and lowering catalyst temperature. Air-fuel enrichment reduces exhaust gas temperature since complete combustion does not occur and combustion heat is transferred to the uncombusted fuel cooling the exhaust. The reduction in engine air amount permitted by fuel enrichment, which increases torque, further lowers catalyst temperature by decreasing the mass flow rate to the catalyst.

The present invention provides a number of advantages. The present invention provides the advantage of regulating catalyst temperature while maintaining engine torque, resulting in improved vehicle drivability. Also, the present invention improves fuel economy while regulating catalyst temperature since less engine air can be used to maintain the desired engine torque.

The above advantages and other advantages of the present invention will be readily apparent from the following Detailed Description when taken alone or in connection with the accompanying drawings.

BRIEF DESCRIPTION OF THE DRAWINGS

The advantages described herein will be more fully understood by reading an example of an embodiment in which the invention is used to advantage, referred to herein as the Description of Embodiments of the Invention, with reference to the drawings, wherein.

DESCRIPTION OF EMBODIMENTS OF THE INVENTION

Figure 1:
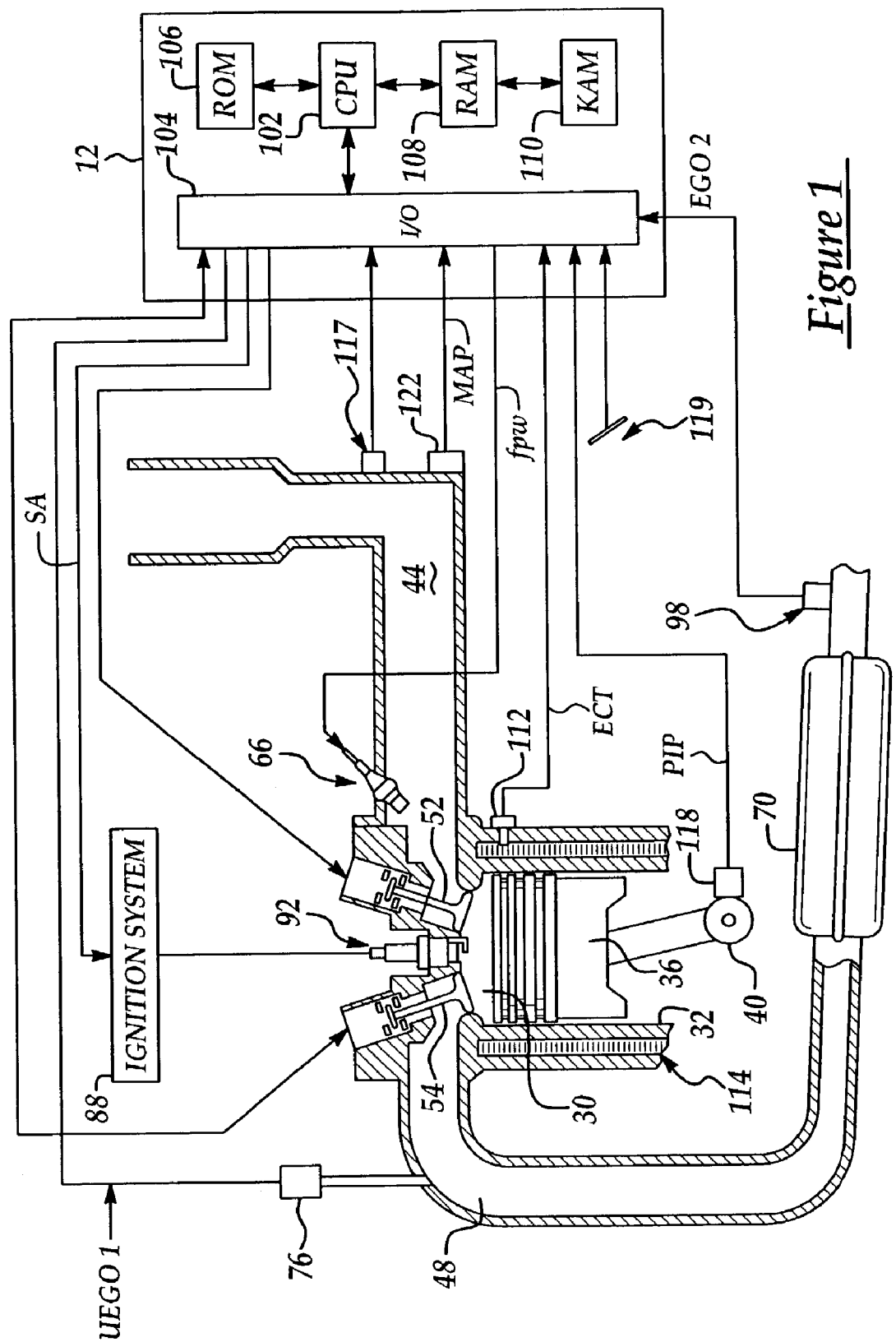
FIG. 1 is a schematic diagram of an engine wherein the invention is used to advantage.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown).

Alternatively, the engine may be configured such that the fuel is injected directly into the engine cylinder, which is known to those skilled in the art as direct injection.

Conventional distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70.

Controller 12 is shown in FIG. 1 as a conventional microcomputer including: microprocessor unit 102, input/output ports 104, and read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present invention, engine position sensor 118 produces a predetermined number of equally spaced pulses every revolution of the crankshaft from which engine speed (RPM) can be determined.

Figure 2:
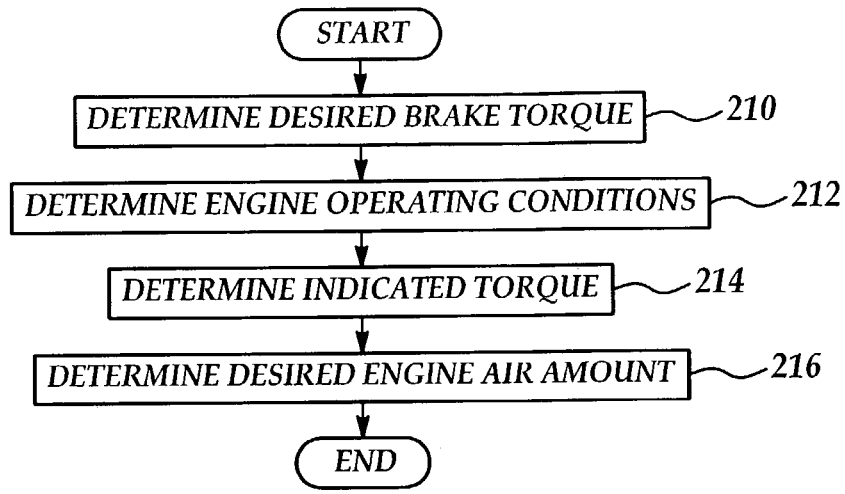
FIG. 2 is a high level flow chart describing engine air charge determination based on desired engine torque for an engine with electrically actuated valves.

Referring to FIG. 2, a flowchart of a routine performed by controller 12 to estimate engine air amount for an engine with electrically actuated valves. In this embodiment an engine is throttled using valve timing and engine air amount is based on a desired engine brake torque.

In step 210, desired engine brake torque is determined by sampling pedal sensor 119. The pedal sensor signal is used as an input to function FNENGBRK. Pedal position is input to FNENGBRK and the function outputs desired engine break torque, Tor_Brk_Des. Alternatively, a vehicle speed controller may determine the desired engine break torque.

In step 212, engine operating conditions are read. Operating conditions are determined by measuring engine coolant temperature, engine speed, time since start, barometric pressure, ambient air temperature, time since engine last operated (soak time), and parameters alike. These parameters are used to compensate the desired engine indicated torque request in block 214. The parameters influence engine operation in different ways depending on their state. For example, lower engine temperatures increase engine friction torque when the engine is cold, and engine friction torque decreases as engine temperature approaches nominal operating temperature.

In step 214, the routine determines desired engine indicated torque, i.e., internal engine torque developed as a result of cylinder pressure from combustion. The operator desired engine brake torque, input via pedal sensor 119, is related to desired engine indicated torque by the following equation:

Tor_Ind_Des=Tor_Brk_Des+Tor_Fric+Tor_Pmp+Tor_Acc

Where the desired engine indicated torque, Tor_Ind_Des, is the summation of desired engine brake torque, Tor_Brk_Des, plus the engine friction torque, Tor_Fric, plus the engine accessory torque, Tor_Acc.

Engine operating conditions determined in step 210 are used to compensate the individual torque terms of the desired engine indicated torque equation. For example, engine valve timing or engine load and engine speed are inputs to empirically determined table FNPMPTRQ whose output is then multiplied by empirically determined function FNBP to produce engine pumping torque in FT-LBS, Tor_Pmp.

Empirically determined friction torque values, Tor_Fric, are stored in ROM 106 as table FNTORFRIC. The table has indices of engine speed and engine load or engine valve timing. The output of FNTORFRIC is adjusted from nominal values for engine operating conditions by multiplying it by the output of empirically determined function FNFRCCOMP. Engine coolant temperature and time since start are indices into FNFRCCOMP, values in FNFRCCOMP are typically greater than the number one at lower engine coolant temperatures and where time since small is small. As engine coolant temperature approaches some nominal operating value and as the time since start increases, the values in FNFRCCOMP go to one. Compensation has the effect of producing higher friction torque at lower engine temperatures and when time since start is small.

Torque calculations are based on nominal air-fuel and spark conditions, i.e., stoichiometry and minimum spark for best torque (MBT) spark. Therefore, when operating conditions call for operation away from nominal air-fuel and spark conditions, additional compensation is provided. Torque compensation for spark deviation from (MBT) and air-fuel deviation from stoichiometry is provided by the following equation:

Tor_Ind_Corr=Tor_Ind_Des·fnTor_spk($\delta-\delta_{MBT}$)·fnTor_lam($\lambda$)

Desired indicated corrected torque, Tor_Ind_Corr, is determined from desired indicated torque modified by spark deviation from MBT, fnTor_spk, and by Lambda, fnTor_lam. Data in the empirically determined function fnTor_lam follows the form of FIG. 7. Data in the empirically determined function fnTor_spk follows the form of FIG. 8. Compensation for spark and Lambda increases Tor_Ind_Corr if spark is retarded from MBT or is lean of Lambda=1 and decreases Tor_Ind_Corr if Lambda<1. Torque corrections based on spark advance away from MBT and Lambda away from stoichiometry do not include deviations resulting from catalyst temperature control.

In step 216, desired engine air amount is determined. Since the engine is throttled by valve timing, i.e., the valves are the throttle, and no throttle is present up stream of the engine valves. The absence of an upstream throttle reduces engine pumping losses but may cause bi-directional flow in the intake assembly. In general, mass air flow sensors do not measure bi-directional flow well. Therefore, the inventor has developed an alternative method to determine engine air amount that does not rely on a mass airflow sensor. This method is based on the following equation:

$$\text{Des\_IMEP} = C_0 + C_1 \cdot N + C_2 \cdot AFR + C_3 \cdot AFR^2 + C_4 \cdot \frac{FUELMASS}{CYLINDER} + C_5 \cdot \left(\frac{FUELMASS}{CYLINDER}\right)^2$$

Where $C_0$–$C_5$ are polynomial constants determined by regressing desired indicated mean effective pressure (Des_IMEP) from engine RPM (N), engine air-fuel ratio (AFR), and fuel mass per cylinder. The regression is performed on data collected while the engine is operating at a stoichiometric air-fuel ratio. The above-mentioned Des_IMEP equation can be manipulated so that engine fuel mass can be determined by the following equation:

$$Des\_FUELMASS = C_0 + C_1 \cdot N + C_2 \cdot AFR + C_3 \cdot AFR^2 + C_4 \cdot Des\_IMEP + C_5 \cdot Des\_IMEP^2$$

In order to tie the fuel mass equation back to the operator demand sensed at pedal sensor 119, Des_IMEP is related to desired indicated corrected engine torque, Des_Tor_Ind_Corr. For a four cycle engine Des_IMEP can be related to desired indicated engine torque by the following equation:

$$Des\_Tor\_Ind\_Corr(lbf \cdot ft) = \frac{Des\_IMEP\left(\frac{lb}{in^2}\right) * V_d(in^3)}{150.8}$$

By simply knowing the engine displacement volume, $V_d$, and Des_IMEP, desired indicated corrected engine torque can be determined. Then, by substitution, desired fuel mass can be calculated using the before-mentioned desired fuel mass equation, Des_FUELMASS. After fuel mass is determined engine air amount, ENG_AIR, can be calculated to produce a stoichiometric air-fuel ratio given the stoichiometric air-fuel ratio. For example, assuming a stoichiometric air-fuel ratio of 14.6:1, and desired fuel mass of $5.0 \times 10^{-5}$ lbs, ENG_AIR=$7.3 \times 10^{-4}$ lbs of engine air are desired. The final engine air amount is calculated by the equation: ENG_AIR_TOTAL=ENG_AIR+CAT_AIR. CAT_AIR is determined in steps 418 and 424 of FIG. 4. Engine air amount, ENG_AIR_TOTAL, is then used to schedule engine valve timing so that the engine inducts ENG_AIR_TOTAL amount of air. Although engine air amount is calculated assuming a stoichiometric air-fuel mixture based on desired fuel mass in step 216, the fuel mass delivered is determined in step 326 and 324 of FIG. 3.

Alternatively, an electronic throttle can adjust engine air amount. Since an air mass sensor can be used with and electronic throttle, engine air mass can be determined directly.

The above-mentioned calculations are performed on a per cylinder basis so that each cylinder will have unique engine air and fuel amounts. In other embodiments, such as electronic throttle, engine air amount may be determined for a mass airflow sensor or a manifold pressure transducer.

Figure 3:
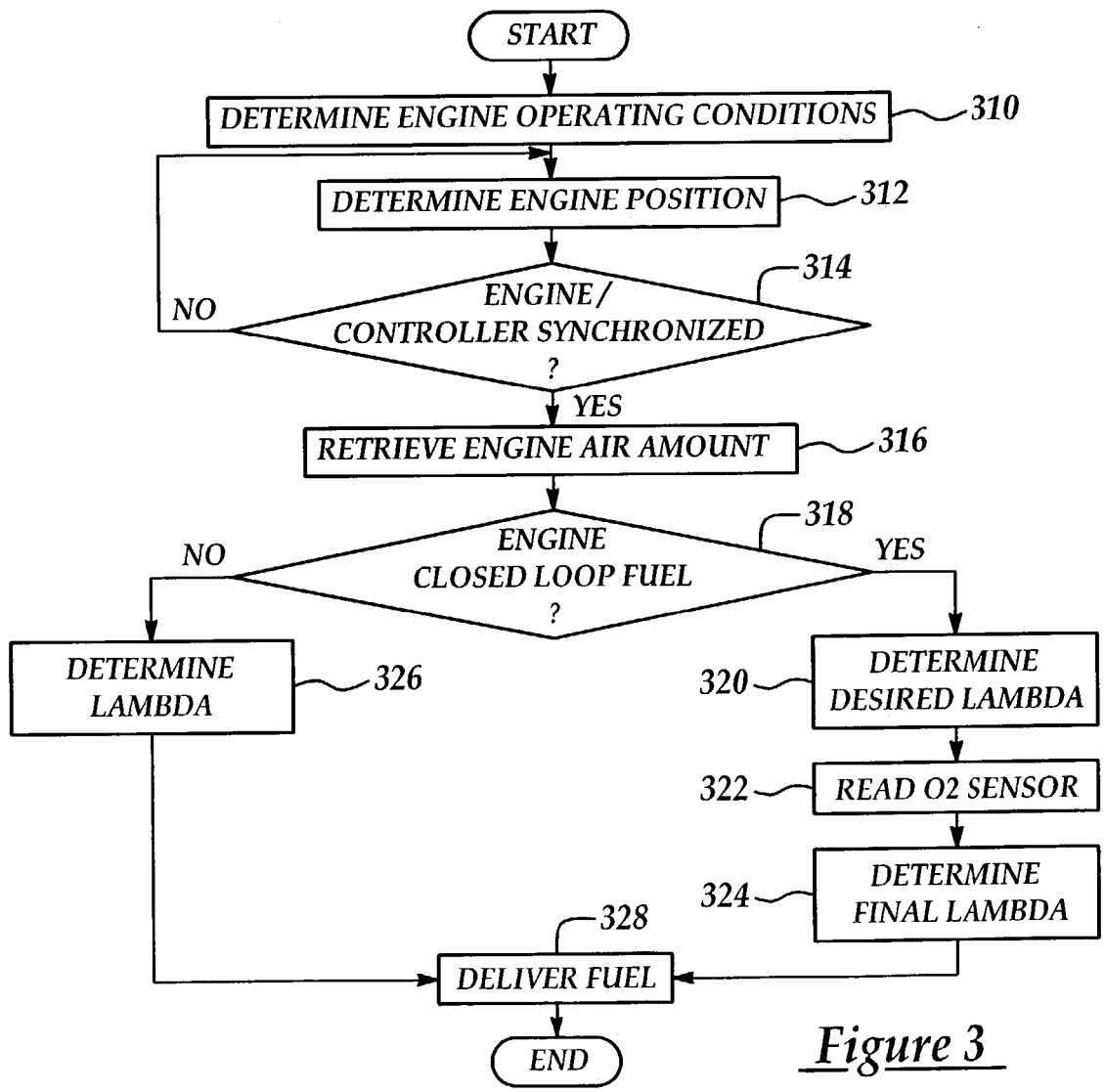
FIG. 3 is a high level flow chart describing sequential (S.E.F.I) fuel injection.

Referring to FIG. 3, a flowchart of a routine performed by controller 12 to control fuel based on a sequential injection is shown, i.e., each injection has a corresponding cylinder air charge amount.

In step 310, engine operating conditions are read. Operating conditions are determined by measuring engine coolant temperature, time since start, and parameters alike. These parameters are used to compensate the engine fuel request in step 328. These parameters influence engine operation depending on their state. For example, low engine coolant temperatures provide air-fuel enrichment.

In step 312, controller 12 monitors cam and crank signals to determine engine position. When engine position is established, engine controller 12 aligns operations, spark and fuel delivery, to engine timing, becoming synchronized. Fuel delivery is suspended until synchronization occurs.

In step 314, controller 12 determines if synchronization between controller 12 and engine 10 has occurred. Synchronization occurs when engine timing is aligned with engine controller operation. If synchronization has occurred the routine proceeds to step 316, if not, the routine proceeds to step 312.

In step 316, the engine air amount is retrieved from step 216 of FIG. 2. Then the routine proceeds to step 318 where open loop or closed loop fuel control is selected. Determination between open loop and closed loop fuel control is based on UEGO sensor 76 temperature, time since start, and engine coolant temperature. Open loop fuel control determines engine fuel amount without feedback from UEGO sensor 76, closed loop fuel control controls fuel based on UEGO sensor 76. If open loop fuel is selected the routine proceeds to step 326. If closed loop fuel control is selected the routine proceeds to step 320.

In step 320, desired base closed loop Lambda is determined from: BASECLLAM=CAT_LAM+FNCLLAM. CAT_LAM is determined in steps 420 and 424 of FIG. 4. Table FNCLLAM, stored in ROM 106, contains the desired base closed loop Lambda value and is based on engine coolant temperature and time since start. Desired Lambda is the basis for producing an engine air-fuel ratio. Lambda is defined as:

$$Lambda(\lambda) = \frac{\frac{Air}{Fuel}}{\frac{Air}{Fuel}_{stoichiometry}}$$

The routine then continues on to step 322 where the oxygen sensor is read. Controller 12 uses the sensor output to determine the relative rich or lean level of the exhaust gases. The routine then proceeds to step 324.

In step 324, final Lambda., LAMBDA_FIN, is determined. LAMBDA_FIN is a value that is used to calculate a fuel mass that is delivered to the engine and is based on desired base closed loop Lambda, BASECLLAM, and the oxygen sensor measurement, i.e., feedback. There are many known control methods that may be used to determine a final Lambda value, alternatives include but are not limited to, Proportional-Integral (PI) control, Proportional-Integral-Derivative (PID) control, and Linear Quadratic Regulation (LQR). For the purpose of illustration PI control is selected. Such a method for controlling fuel delivery is described by D. Milot in SAE Paper 922172. The routine then moves to step 328.

If engine operating conditions prevent closed loop fuel control from being selected in step 318 then open loop fuel control is performed by proceeding to step 326. In step 326, the desired Lambda is calculated from the equation: LAMBDA_FIN=BASEFUL−FNLOST+CAT_LAM. BASEFUL is the desired Lambda value interpolated from a table based on engine speed and load. FNLOST is the lost fuel amount interpolated from a table based on time since start and engine coolant temperature. The lost fuel amount represents unaccounted fuel that is not present in the exhaust gas. Typically, this is fuel that passes cylinder rings and enters the crankcase when an engine is cold. The routine continues on to step 328.

In step 328, individual cylinder fuel mass is calculated and delivered. Fuel mass is based on the final Lambda value calculated in steps 324 and 326, engine air amount retrieved from step 216. Base fuel mass is calculated as follows:

$$Fuel\_Mass = \frac{ENG\_AIR\_TOTAL}{\frac{Air}{Fuel_{stoichiometry}} \cdot LAMBDA\_Fin}$$

After fuel mass is calculated, fuel pulse width is determined from the calculated fuel mass and a function that represents the time to deliver a given fuel mass. The fuel amount is then delivered to the engine and the routine exits.

Figure 4:
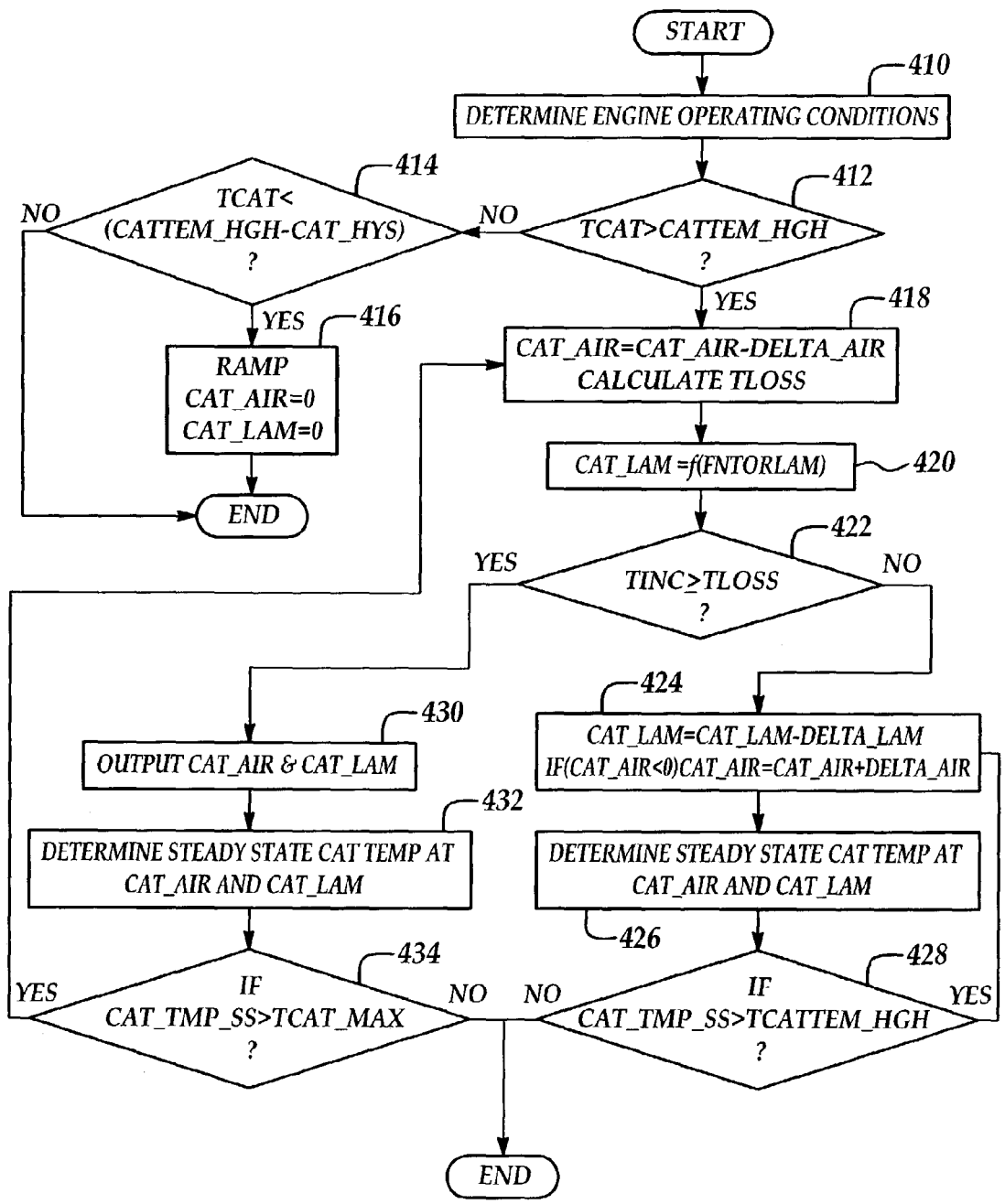
FIG. 4 is a high level flow chart of one embodiment of catalyst temperature control.

Referring to FIG. 4, a flowchart of a high level flow chart of one embodiment of catalyst temperature control with an internal combustion engine that uses electrically actuated valves. In step 410, engine operating conditions including engine speed, air-fuel-ratio, spark advance, and coolant temperature, are read. Operating conditions are used in steps 428 and 432 to determine catalyst temperature. The routine continues on to step 412.

In step 412, catalyst temperature is compared to a catalyst temperature limit. The catalyst washcoat and substrate design are elements that factor into the catalyst temperature limit. Since extended operating time above the temperature limit may lead to deterioration in catalyst long-term performance it is desirable to regulate catalyst temperature below an upper boundary. The catalyst temperature upper boundary, CATTEM_HGH, is predetermined and stored in ROM 106. Alternatively, it can be adapted based on operating conditions. Typically, catalyst temperature is inferred from engine speed, air-fuel ratio, EGR, spark advance, and engine air amount by a known method such as that disclosed in U.S. Pat. No. 5,303,168 owned by the assignee of the present invention.

Alternatively, catalyst temperature can be measured by using a thermocouple or another device to directly measure catalyst temperature. If a direct measurement of catalyst temperature is used, compensation due to the time constant of the measurement device can also be used.

Catalyst temperature at the current operating conditions, TCAT, and catalyst temperature at stoichiometric air-fuel, TCATS, are determined using the before-mentioned method.

After the catalyst temperature is determined, it is compared to the catalyst temperature upper boundary. If the catalyst temperature, TCAT, is below the catalyst temperature upper boundary, CATTEM_HGH, the routine proceeds to step 414. If catalyst temperature is above the catalyst temperature upper boundary, TCAT>CATTEM_HGH, then the routine proceeds to step 418.

In step 414, catalyst temperature at stoichiometric conditions, TCATS, is compared to CATTEM_HGH-CAT_HYS. CAT_HYS is a term that provides separation between where the catalyst temperature control is enabled and disabled. If catalyst temperature at stoichiometry is below the catalyst temperature upper boundary minus a hysteresis term, TCATS<CATTEM_HGH-CAT_HYS, the routine proceeds to step 416. If catalyst temperature at stoichiometry is greater than the catalyst temperature upper boundary minus a hysteresis term, TCATS>CATTEM_HGH-CAT_HYS, the routine exits. available torque from FNTORLAM is stored in TDIFF. The routine then proceeds to step 422.

In step 422, the torque increase produced by fuel enrichment, TINC, is compared to the torque reduction due to engine air amount reduction, TLOSS. If the torque reduction due to engine air amount reduction can be countered by the torque increase due to fuel enrichment the routine proceeds to step 430. If enrichment cannot provide enough torque to balance the torque reduction due to less engine air amount then the routine proceeds to step 424.

In step 424, fuel enrichment is used as the primary parameter to reduce catalyst temperature. Since step 422 determined that engine torque could not be maintained by fuel enrichment and engine air amount reduction, fuel enrichment is used in conjunction with ramping CAT_AIR by the amount in the parameter DELTA_AIR until CAT_AIR equals zero. Engine air-fuel is enriched as a result of decreasing CAT_LAM by DELTA_LAM. After reducing CAT_LAM the parameter is made available to steps 326 and 320 of FIG. 3. DELTA_LAM can be a constant or a function engine speed or a function of the difference between catalyst temperature and the catalyst temperature upper boundary.

This path of the routine is used when the requested engine torque and catalyst temperature are high and reducing engine air amount and increasing fuel cannot be used to achieve catalyst temperature control. For example, fuel enrichment is used for catalyst temperature control when towing a heavy load up a grade or during extended full load accelerations. The routine then proceeds to step 426.

In step 426, catalyst temperature is determined, TCAT. Catalyst temperature is again estimated by the In step 416, the parameters AIR_CAT and CAT_LAM are ramped to zero then the routine exits, i.e., BYPASS mode.

In step 418, the parameter CAT_AIR is reduced by the amount in the parameter DELTA_AIR. The value in parameter DELTA_AIR may be a constant or a function engine speed or a function of the difference between catalyst temperature and the catalyst temperature upper boundary limit. The torque loss due to reduction in engine air amount, TLOSS, is then calculated from the same equations used in step 216 of FIG. 2. However, since the reduction of engine air amount is known, DETLA_AIR, calculations are performed in reverse order of those in FIG. 2. i.e., fuel mass is determined from DELTA_AIR, then IMEP and engine torque follow. The reduction in engine air amount causes exhaust gas temperature to lower as explained in the description of FIG. 6. The routine then continues on to step 420.

In step 420, fuel enrichment for catalyst temperature control is determined. Fuel enrichment has the effect of cooling exhaust as explained in the description of FIG. 5 and it also increases engine torque as explained in the description of FIG. 7. The amount of fuel enrichment is determined by calculating the percent torque loss from desired indicated corrected torque, TDIFF=TLOSS/Des_Tor_Ind_Corr. Then using function FNTORLAM, a function describing the torque/Lambda relationship shown in FIG. 7 to determine the change in Lambda needed to compensate for the torque reduction that results from the lower engine air amount determined from step 418. The input to FNTORLAM is percent torque change and the output is in units of Lambda. The percent torque available from FNTORLAM is stored in the variable TINC. If TINC cannot match TDIFF the highest value of percent method disclosed in U.S. Pat. No. 5,303,168. The routine then proceeds to step 428.

In step 428, the catalyst temperature, TCAT, is compared to CATTEM_HGH. If catalyst temperature is greater than the catalyst temperature upper boundary, TCAT>CATTEM_HGH, the routine returns to step 424. The routine continues to return to step 424 until the steady state catalyst temperature falls below the catalyst upper boundary temperature. This looping process produces a fuel ramping effect so that torque disturbances due to catalyst protection are reduced. If the catalyst temperature is below the catalyst temperature upper boundary, TCAT<CATTEM_HGH, the routine exits If engine torque can be maintained while engine air amount is reduced the routine proceeds from step 422 to step 430. In step 430, catalyst temperature control parameters CAT_AIR and CAT_LAM are made available to step 216 FIG. 2 and steps 320 and 326 of FIG. 3. The routine then continues to step 432.

In step 432, steady state catalyst temperature is determined. Catalyst temperature is estimated by the method disclosed in U.S. Pat. No. 5,303,168. The catalyst temperature, TCAT, is compared to the catalyst high temperature boundary, CATTEM_HGH in step 434. If catalyst temperature is greater than the catalyst temperature upper boundary, TCAT>CATTEM_HGH, the routine returns to step 418. The routing returns to step 418 until the steady state catalyst temperature falls below the catalyst upper boundary temperature. This looping process produces a fuel ramping effect so that torque disturbances due to catalyst protection are reduced. If the catalyst temperature is less than the catalyst temperature upper boundary, TCAT<CATTEM_HGH, the routine exits.

Figure 10:
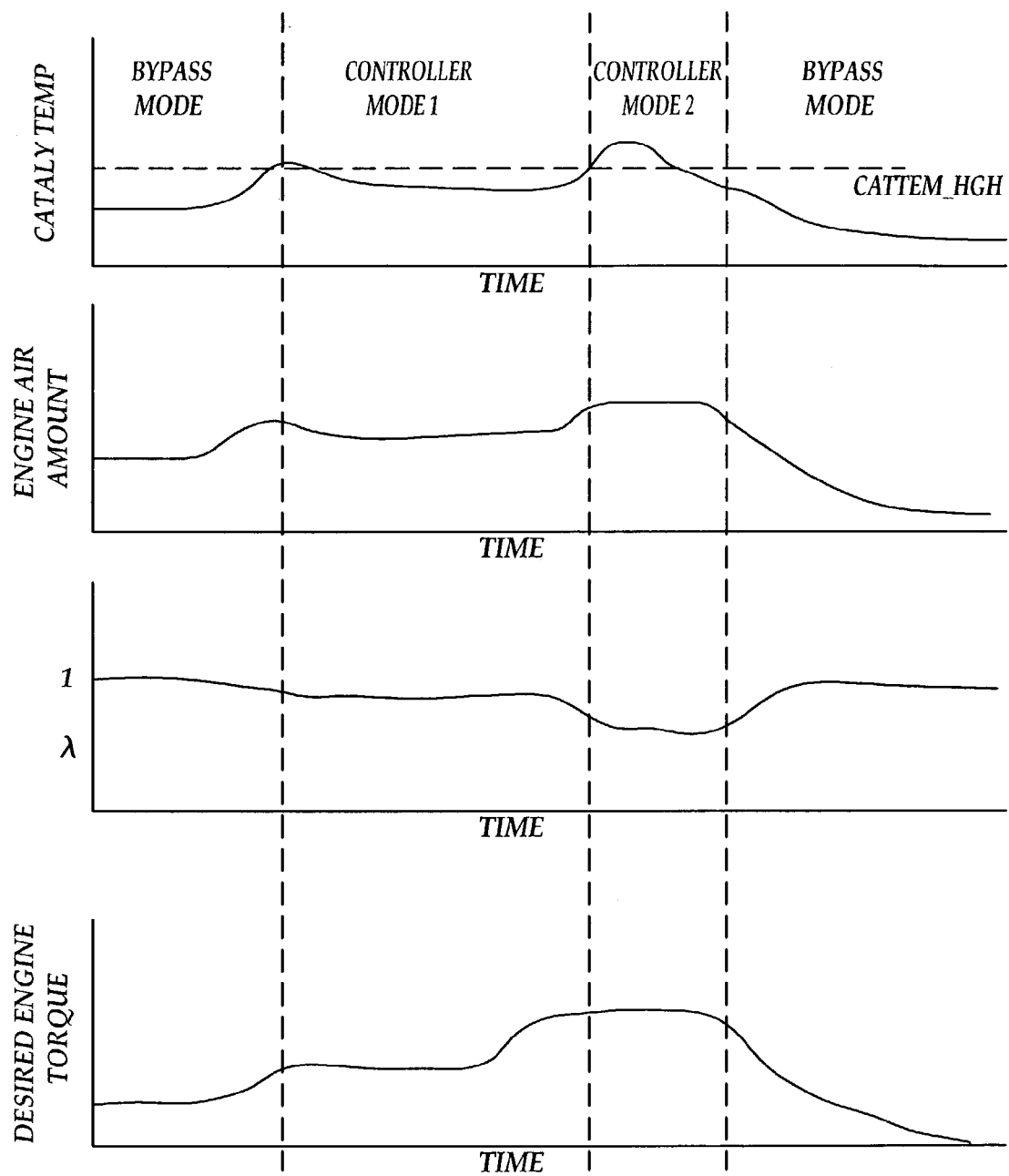
FIG. 10 is a plot showing examples of selected signals during operation of two separate modes of catalyst temperature control.

The two paths from step 422 effectively produce two operating modes for the catalyst temperature controller. The first mode, the left path, is taken when engine torque can be maintained by engine air reduction and fuel enrichment. If the catalyst temperature exceeds the catalyst upper boundary temperature then the engine air amount is reduced and fuel is enriched. This mode of operation is shown in FIG. 10 and is identified as Mode 1. If catalyst temperature reduction and operator requested torque cannot be achieved by engine air amount reduction and fuel enrichment then the right path is selected. This mode is identified in FIG. 10 as Mode 2. In this mode CAT_AIR is ramped toward zero and fuel is enriched until the catalyst temperature is lowered. CAT_AIR cannot be larger than zero. This mode is similar to other known catalyst temperature control methods.

Figure 5:
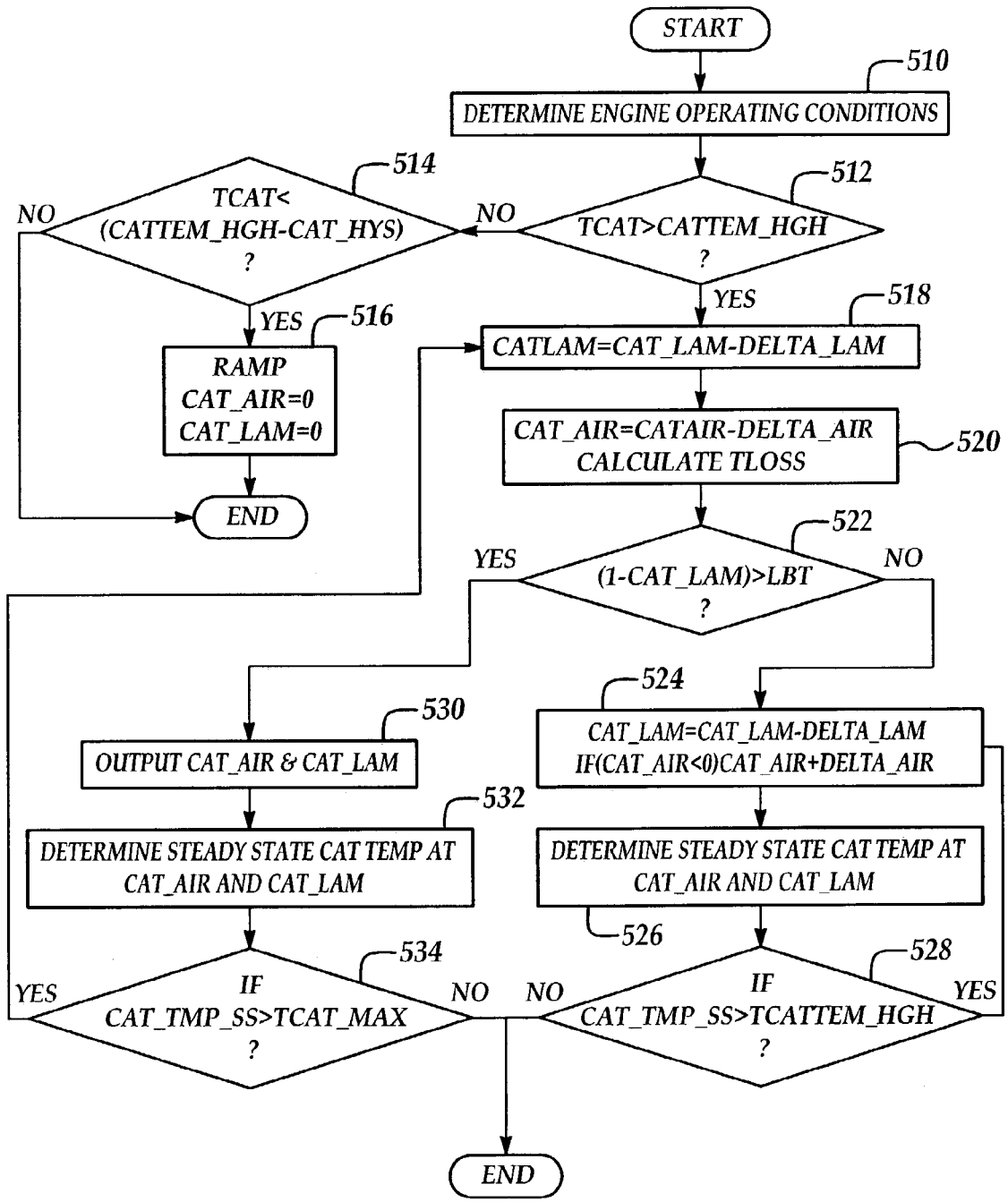
FIG. 5 is a high level flow chart of an alternative embodiment of catalyst temperature control.

Referring to FIG. 5, a high level flow chart of an alternative embodiment of catalyst temperature control with an electrically throttled internal combustion engine. In step 510, engine operating conditions including engine speed, air-fuel-ratio, spark advance, and coolant temperature, are read. Operating conditions are used in steps 526 and 532 to determine catalyst temperature. The routine continues on to step 512.

In step 512, catalyst temperature is compared to a catalyst temperature limit. The catalyst washcoat and substrate design are elements that factor into the catalyst temperature limit. Since extended operating time above the temperature limit may lead to deterioration in catalyst long-term performance it is desirable to regulate catalyst temperature below an upper boundary. The catalyst temperature upper boundary, CATTEM_HGH, is predetermined and stored in ROM 106. Alternatively, it can be adapted based on operating conditions. Typically, catalyst temperature is inferred from engine speed, air-fuel ratio, EGR, spark advance, and engine air amount by a known method such as that disclosed in U.S. Pat. No. 5,303,168 owned by the assignee of the present invention.

Catalyst temperature at the current operating conditions, TCAT, and catalyst temperature at stoichiometric air-fuel, TCATS, are determined using the before-mentioned method.

After the catalyst temperature is determined, it is compared to the catalyst temperature upper boundary. If the catalyst temperature, TCAT, is below the catalyst temperature upper boundary, CATTEM_HGH, the routine proceeds to step 514.

In step 514, catalyst temperature at stoichiometric conditions, TCATS, is compared to CATTEM_HGH-CAT_HYS. If catalyst temperature at stoichiometry is below the catalyst temperature boundary minus a hyteresis term, TCATS<CATTEM_HGH-CAT_HYS, the routine proceeds to step 516. If catalyst temperature at stoichiometry is greater than the catalyst temperature upper boundary minus a hysteresis term, TCATS>CATTEM_HGH-CAT_HYS, the routine exits.

In step 516, the parameters CAT_AIR and CAT_LAM are ramped to zero then the routine exits, i.e., BYPASS mode.

In step 518, the parameter CAT_LAM is decreased by the amount in the parameter DELTA_LAM. The value in parameter DELTA_LAM may be a constant or a function engine speed or a function of the difference between catalyst temperature and the catalyst temperature upper boundary limit. The engine torque may increase due to fuel enrichment depending on the final air-fuel ratio. Using FNLAMTOR, a function describing the torque/Lambda relationship similar to that shown in FIG. 8 to determine the percent change in engine torque that results from the increase in air fuel enrichment. The input to FNLAMTOR is in units of Lambda and the output, TORINC, is percent torque change. The estimated torque change can then be calculated by: TDIFF=TORINC*DES_Tor_Ind_Corr. TDIFF is the absolute value of engine torque produced by fuel enrichment. The routine then continues on to step 520.

In step 520, engine air amount reduction for catalyst temperature control is determined. If the fuel enrichment from step 518 will result in a torque increase then the amount of reduction in engine air amount, AIR_CAT, is calculated from the same equations used in step 216 of FIG. 2. i.e., IMEP is determined from TDIFF and then engine air amount follows. The routine then proceeds to step 522.

In step 522, the fuel enrichment used to change engine torque is compared to the least fuel for best torque operating point. The comparison is made by the following equation: (1−CAT_LAM)>LBT. If additional fuel enrichment will produce an increase in engine torque the routine proceeds to step 530. If additional fuel enrichment will not produce an increase in engine torque then the routine proceeds to step 524.

In step 524, fuel enrichment is used as the primary parameter to reduce catalyst temperature. Since step 522 determined that engine torque could not be maintained by fuel enrichment and engine air amount reduction, fuel enrichment is used in conjunction with ramping CAT_AIR to by the amount in the parameter DELTA_AIR until CAT_AIR equals zero. Engine air-fuel is enriched as a result of decreasing CAT_LAM by DELTA_LAM. After reducing CAT_LAM the parameter is made available to steps 326 and 320 of FIG. 3. DELTA_LAM can be a constant or a function engine speed or a function of the difference between catalyst temperature and the catalyst temperature upper boundary.

This path of the routine is used when the requested engine torque and catalyst temperature are high and reducing engine air amount and increasing fuel cannot be used to achieve catalyst temperature control. For example, fuel enrichment is used for catalyst temperature control when towing a heavy load up a grade or during extended full load accelerations. The routine then proceeds to step 526.

In step 526, catalyst temperature is determined. Catalyst temperature is again estimated by the method disclosed in U.S. Pat. No. 5,303,168. The routine then proceeds to step 528.

In step 528, the catalyst temperature, TCAT, is compared to CATTEM_HGH. If catalyst temperature is greater than the catalyst temperature upper boundary, TCAT>CATTEM_HGH, the routine returns to step 524. The routine continues to return to step 524 until the steady state catalyst temperature falls below the catalyst upper boundary temperature. This looping process produces a fuel ramping effect so that torque disturbances due to catalyst protection are reduced. If the catalyst temperature is below the catalyst temperature upper boundary, TCAT<CATTEM_HGH, the routine exits.

If engine torque can be maintained while engine air amount is reduced the routine proceeds from step 522 to step 530. In step 530, catalyst temperature control parameters CAT_AIR and CAT_LAM are made available to step 216 FIG. 2 and steps 320 and 326 of FIG. 3. The routine then continues to step 532.

In step 532, steady state catalyst temperature is determined. Catalyst temperature is estimated by the method disclosed in U.S. Pat. No. 5,303,168. The catalyst temperature, TCAT, is compared to CATTEM_HGH in step 534. If catalyst temperature is greater than the catalyst temperature upper boundary, TCAT>CATTEM_HGH, the routine returns to step 518. The routing returns to step 518 until the steady state catalyst temperature falls below the catalyst upper boundary temperature. This looping process produces a fuel ramping effect so that torque disturbances due to catalyst protection are reduced. If catalyst temperature is below the catalyst temperature upper boundary, TCAT<CATTEM_HGH the routine exits The inventor has developed the before-mentioned methods after recognizing that the engine torque can be maintained at a lower engine air amount when the engine air-fuel is enriched. Since the engine can operate at the desired torque with a lower engine air amount, the fuel can be reduced compared to when the engine is operating at a higher engine air amount. While controlling catalyst temperature is important to protect the catalyst from deterioration, fuel consumption affects emissions and operating costs. Therefore, the inventor herein has recognized that it would be beneficial to maintain the desired engine torque and catalyst temperature while consuming less fuel.

Figure 6:
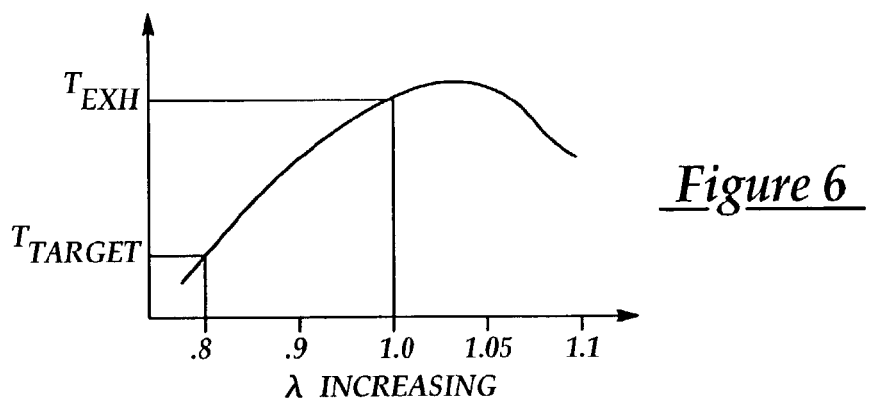
FIG. 6 is a plot showing the effect engine Lambda, relative air-fuel ratio, has on exhaust gas temperature at constant engine speed.

Referring to FIG. 6, a figure showing the influence engine Lambda has on exhaust gas temperature. Notice, that when an engine is operated at stoichiometry, Lambda=1, exhaust gas temperature is near the upper bound of the temperature curve. As Lambda decreases, i.e., air-fuel becomes richer, exhaust gas temperature decreases. Decreasing temperatures result from cooling of evaporating fuel and from the additional fuel mass absorbing heat.

Figure 7:
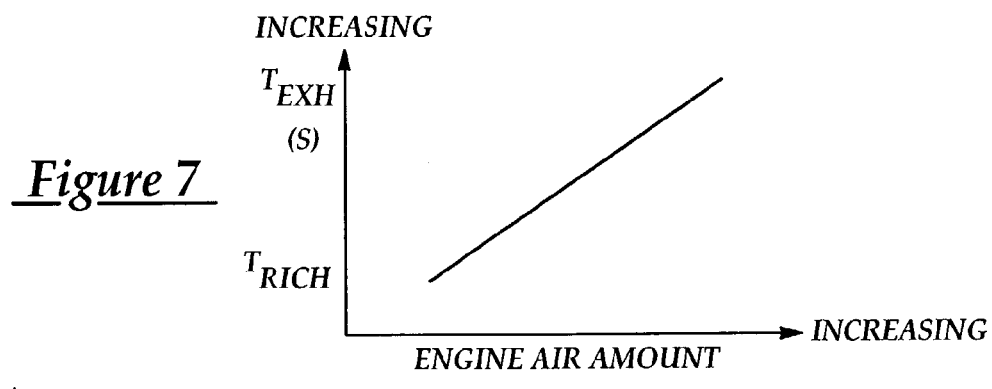
FIG. 7 is a plot showing the effect engine air amount has on engine exhaust temperature at a constant engine speed.

Referring to FIG. 7, a figure that shows the relationship between engine air amount and exhaust gas temperature at a constant engine speed. Notice, as engine air amount increases so does exhaust gas temperature. The temperature increase is a result increasing energy in the engine charge which results in higher cylinder pressures and temperatures.

Figure 8:
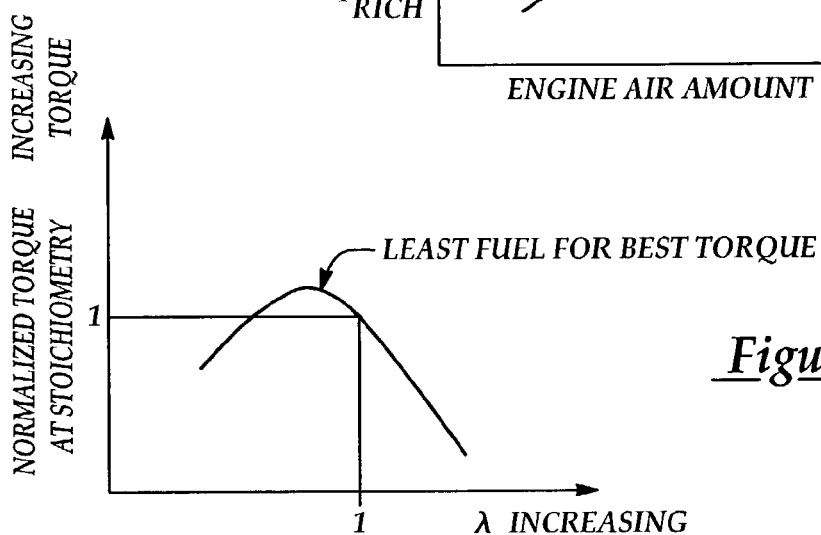
FIG. 8 is a plot showing the effect engine Lambda, relative air-fuel ratio, has on engine torque.

Referring to FIG. 8, a figure that shows the relationship between engine torque output and engine Lambda at a constant engine speed. Typically, engines are operated around stoichiometry, Lambda=1, to increase catalyst efficiency. From the figure, it can be seen that the torque curve increases as the value of Lambda decreases until the point where the least fuel for best torque is reached. From this point, further enrichment results in equal or less torque generation.

Figure 9:
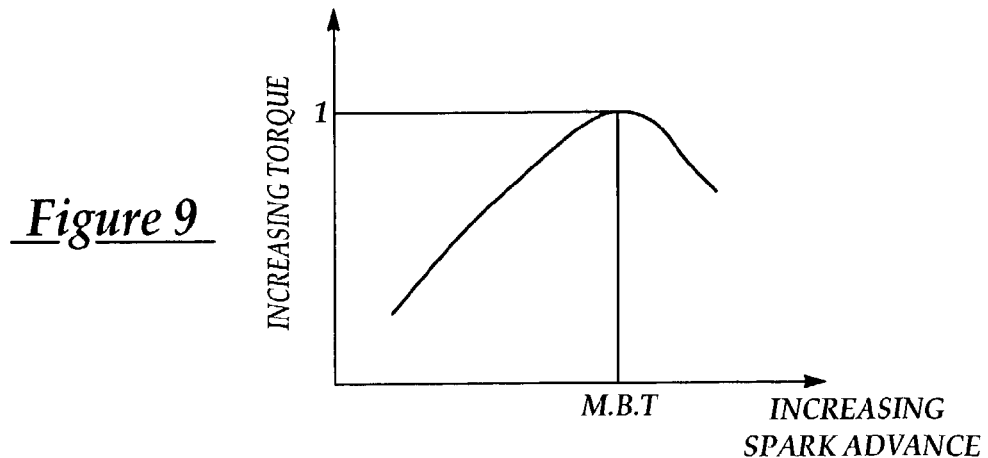
FIG. 9 is a plot showing the effect spark retard from MBT spark has on engine torque.

Referring to FIG. 9, a figure that shows the relationship between engine torque output and engine spark at a constant engine speed. Minimum spark for best torque (MBT) is a point on the x axis that identifies the spark angle where retarding spark lowers engine torque and where further spark advance offers no increase in torque output.

Referring to FIG. 10, a figure that shows examples of selected signals during catalyst temperature control. Engine torque FIG. 10A, Lambda ($\lambda$) FIG. 10B, engine air amount FIG. 10C, and catalyst temperature FIG. 10D are shown in various operating modes. Each plot is sectioned into four areas that represent the three operating modes of the catalyst temperature controller.

From left to right, the first marked area shows operation in the BYPASS mode. This mode does not influence engine operation since catalyst temperature is below the upper catalyst temperature boundary. The second area shows operation in mode 1. In this mode, engine air and injected fuel amounts are adjusted to lower catalyst temperatures while maintaining the desired engine torque. Notice, during the onset of mode 1 catalyst temperature exceeds the catalyst upper boundary. The elevated temperature causes the fuel amount to increase and the engine air amount to decrease. The engine air amount reduction and fuel enrichment result in lower catalyst temperature. As the desired engine torque increases, the controller enters operating mode 2. Since desired torque cannot be achieved by engine air amount reduction and fuel enrichment, engine air amount reduction is ramped to zero and fuel is enriched until catalyst temperature is lowered. As the desired engine torque is reduced, the controller again enters the BYPASS mode.

As will be appreciated by one of ordinary skill in the art, the routines described in FIGS. 2, 3, 4, and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

This concludes the description of the invention. The reading of it by those skilled in the art would bring to mind many alterations and modifications without departing from the spirit and the scope of the invention. For example, I3, I4, I5, V6, V8, V10, and V12 engines operating in natural gas, gasoline, or alternative fuel configurations could use the present invention to advantage. Accordingly, it is intended that the scope of the invention is defined by the following claims:

The invention claimed is:

1. An engine control method to regulate catalyst temperature, the method comprising:
reducing engine air amount and increasing injected fuel amount in response to a catalyst temperature so that engine torque is maintained and said catalyst temperature is lowered in a first operating mode; and discontinuing said engine air amount reduction and increasing said injected fuel amount in response to said catalyst temperature so that said catalyst temperature is lowered in a second operating mode.

2. The method as set forth in claim 1 wherein said fuel amount is further adjusted based on engine temperature.

3. The method as set forth in claim 1 wherein said fuel amount is further adjusted to provide a desired air-fuel ratio.

4. The method as set forth in claim 1 wherein said engine air amount is further adjusted based on engine torque.

5. The method as set forth in claim 1 wherein said engine air amount is adjusting by changing engine valve timing.

6. The method as set forth in claim 1 wherein said engine air amount is adjusted by an electronic throttle.

7. The method as set forth in claim 1 wherein said discontinuation of said engine air amount reduction is an increase in said engine air amount.

8. An engine control method to regulate catalyst temperature, the method comprising:
   reducing temperature of a catalyst coupled to an engine by increasing the amount of fuel injected to an engine and by reducing the air flow to said engine operating at a first engine torque amount; and
   reducing the temperature of said catalyst by increasing the amount of injected fuel at a second engine torque amount, said second engine torque amount greater than said first engine torque amount.

9. The method as set forth in claim 8 wherein said injected fuel amount is further adjusted based on engine temperature.

10. The method as set forth in a desired air-fuel ratio.

11. The method as set forth in claim 8 wherein said engine air amount if further adjusted by changing engine valve timing.

* * * * *